United States Patent [19]

Knapp

[11] Patent Number: 4,804,017
[45] Date of Patent: Feb. 14, 1989

[54] BRAKE BLEEDER VALVE APPARATUS HAVING INTEGRAL CHECK VALVE AND METHOD FOR BLEEDING BRAKES

[76] Inventor: Paul A. Knapp, 1303 W. 9th St., Tempe, Ariz. 85282

[21] Appl. No.: 157,514

[22] Filed: Feb. 17, 1988

Related U.S. Application Data

[63] Continuation-in-part of Ser. No. 909,789, Sep. 22, 1986, abandoned.

[51] Int. Cl.[4] .............................................. F16K 15/18
[52] U.S. Cl. .............................. 137/614.16; 137/614.2; 251/82
[58] Field of Search ................... 137/522, 516.25, 540, 137/614.16, 614.17, 614.18, 614.19, 614.2; 251/82, 346, 348, 351, 354

[56] References Cited

U.S. PATENT DOCUMENTS

| | | | |
|---|---|---|---|
| 2,335,829 | 11/1943 | McBride | 137/614.16 X |
| 2,519,569 | 8/1950 | Hart | 137/614.2 |
| 2,729,228 | 1/1956 | Stevenson | 137/614.18 X |
| 2,892,614 | 6/1959 | Majner | 251/348 X |
| 3,107,691 | 10/1963 | Schwartz | 137/614.2 X |
| 4,524,800 | 6/1985 | Holland | 251/354 X |

*Primary Examiner*—A. Michael Chambers
*Assistant Examiner*—John C. Fox
*Attorney, Agent, or Firm*—H. Gordon Shields

[57] ABSTRACT

Method and apparatus for bleeding brakes includes a brake valve with an integral ball check which secures directly to a brake wheel cylinder. Method for bleeding the brakes includes securing a brake bleeder valve with integral check valve in each wheel cylinder, securing a predetermined length of tubing to the brake bleeder valve, providing a reservoir for brake fluid at the end of the tubing remote from the brake bleeder valve, and pressurizing the brake system.

6 Claims, 2 Drawing Sheets

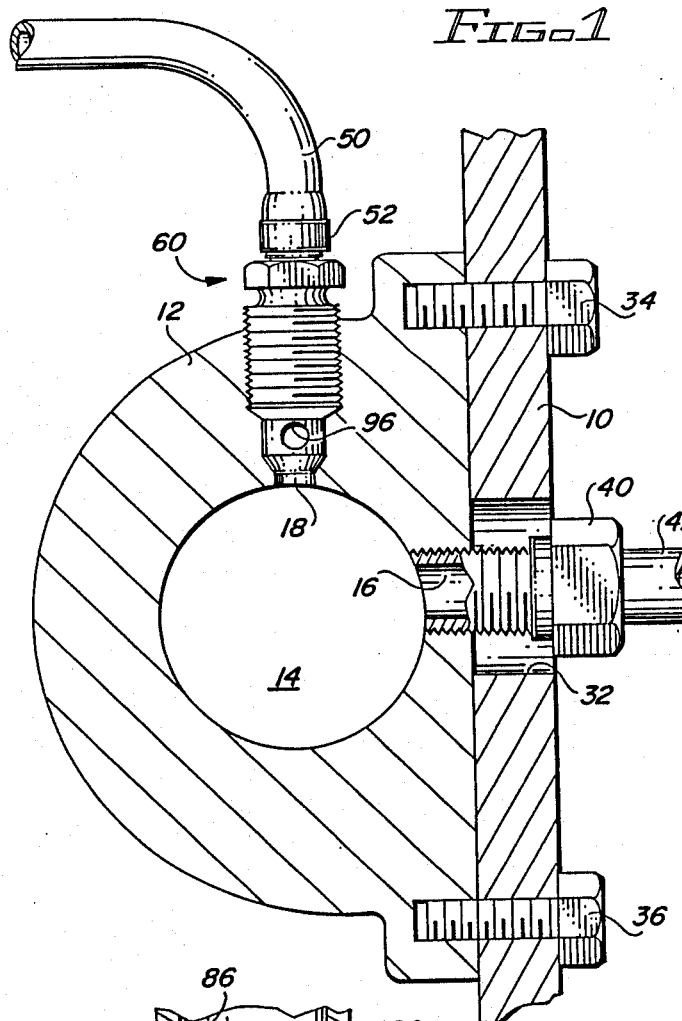
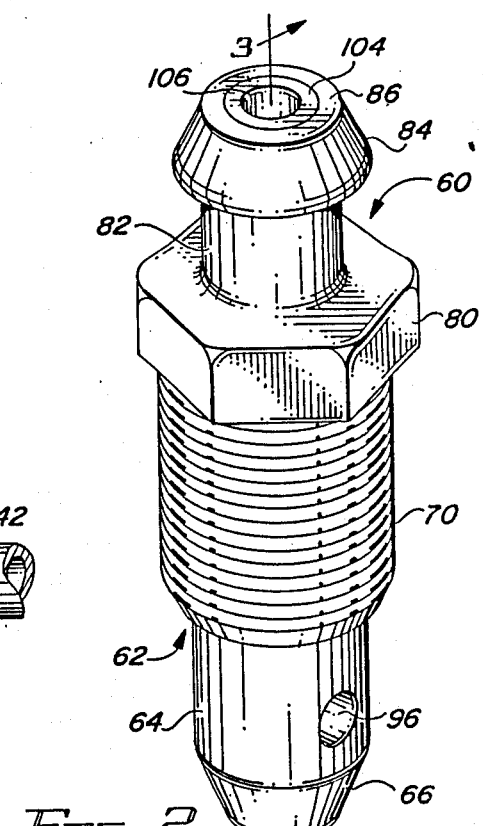
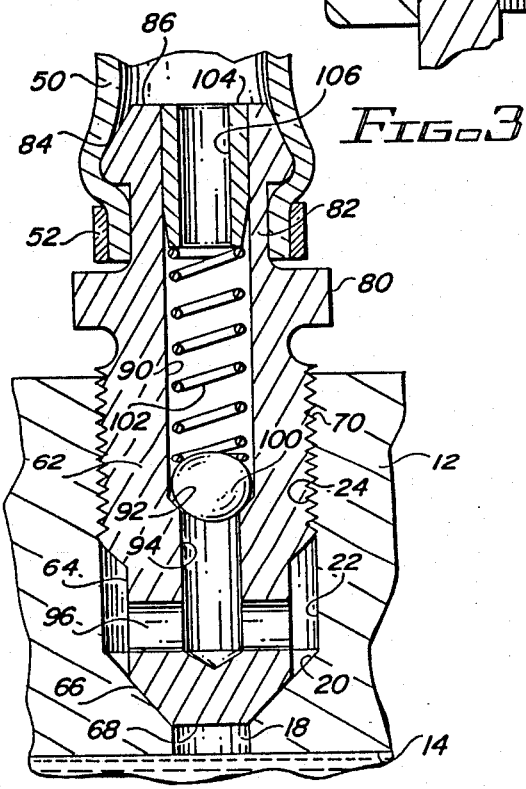
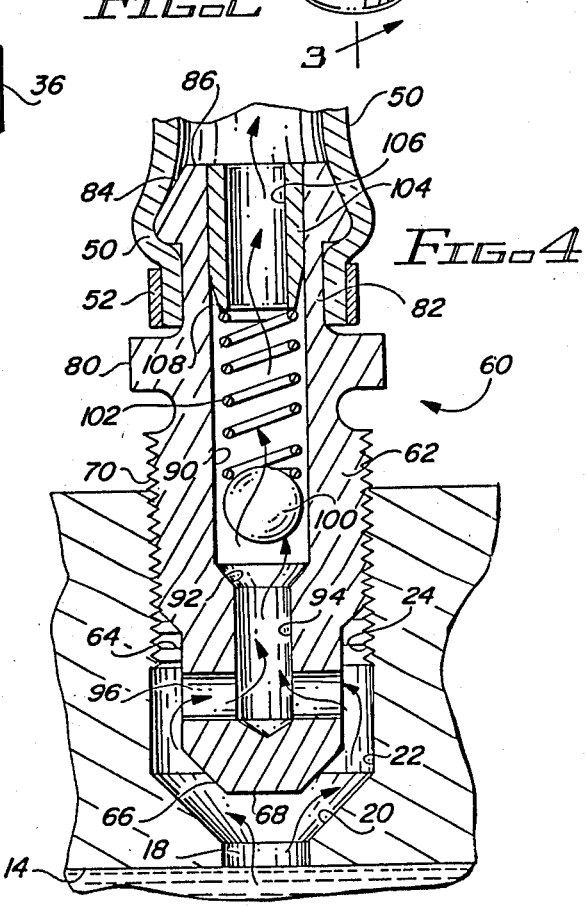

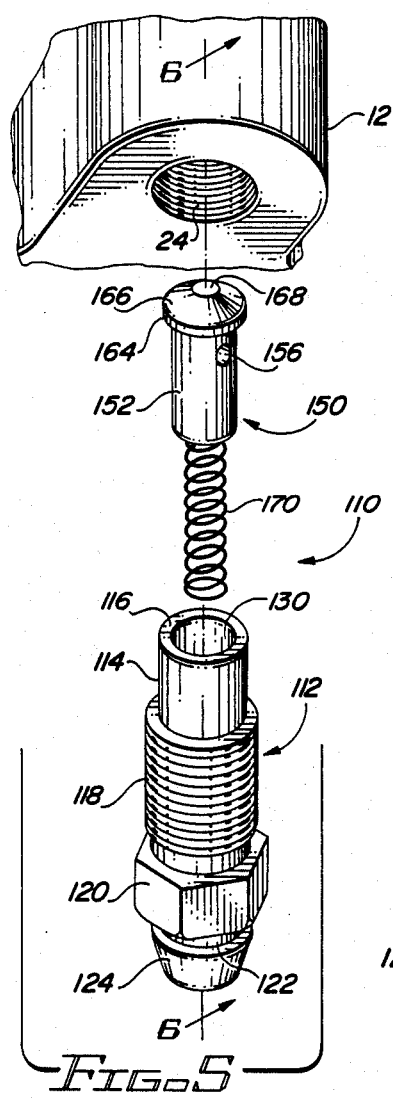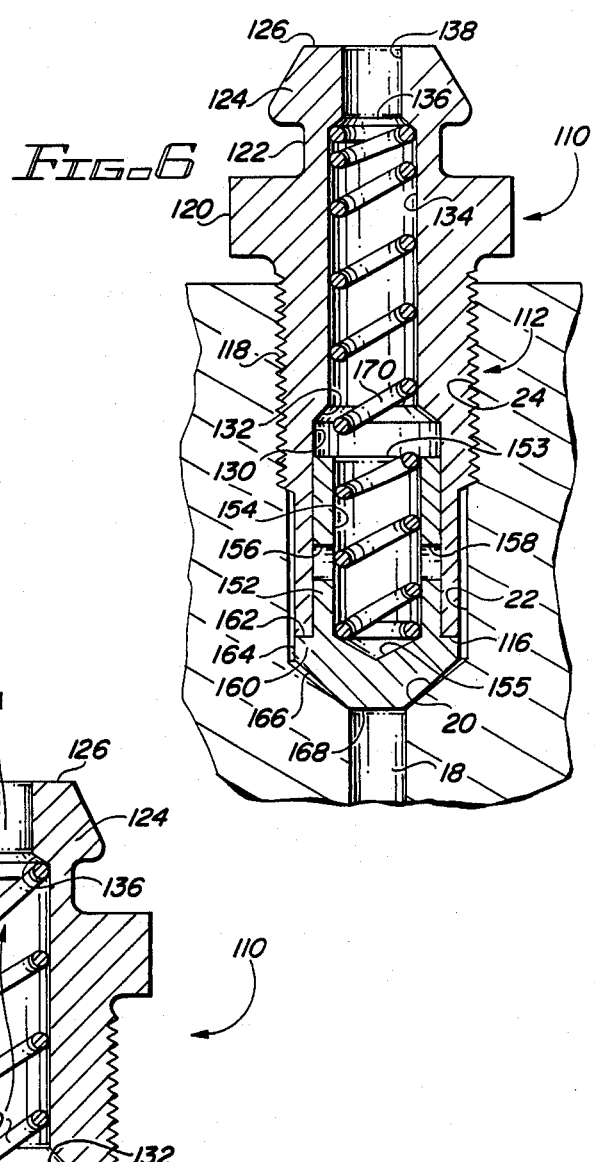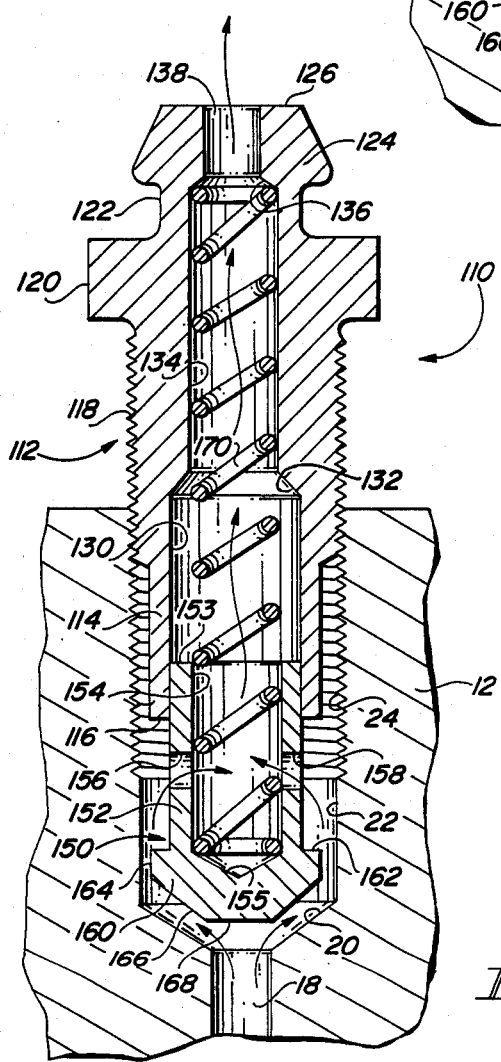

BRAKE BLEEDER VALVE APPARATUS HAVING INTEGRAL CHECK VALVE AND METHOD FOR BLEEDING BRAKES

CROSS-REFERENCE TO RELATED APPLICATION

This is a continuation-in-part application of copending application Ser. No. 909,789, filed Sept. 22, 1986, and now abandoned.

BACKGROUND OF THE INVENTION

1. Field of the Invention:

This invention relates to brake bleeder valve apparatus and a method for bleeding brakes utilizing the brake bleeder valve and, more particularly, to a brake bleeder valve having an integral check valve to prevent brake fluid and air from being sucked back into the brake system during a brake bleeding procedure when hydraulic pressure is removed from the system.

2. Description of the Prior Art:

For many years, the bleeding of brakes has been accomplished by bleeding one brake cylinder at a time. A brake bleeder valve is appropriately secured to each wheel cylinder. A hose or tubing is secured to the brake bleeder valve and the end of the tubing, remote from the brake bleeder valve, is disposed within a receptacle partially filled with brake fluid so that any fluid accidentally sucked back into the system when hydraulic pressure is removed from the system does not include air. Moreover, the presence of air bubbles flowing through the hydraulic fluid is easily noted by an observer.

After the hose and receptacle have been provided, the bleeding of the brakes becomes a job for at least two persons. One person is required to manually open the brake bleeder valve while a person inside the vehicle pushes against the brake pedal to apply hydraulic pressure to the brake system. When the brake pedal is completely pushed, the person at the wheel cylinder closes the valve to prevent fluid and, possibly, air from being sucked back into the system. After the valve is closed, the person inside the car then releases the brake pedal and fresh fluid from the brake reservoir flows into the system. Obviously, at some point, after typically two or three actuations of the brake pedal, additional hydraulic fluid will have to be added to the brake master cylinder reservoir. This may require a third person. In the alternative, either the person in the car or the person at the wheel cylinder may add the hydraulic fluid.

The bleeding of the wheel cylinder continues until no air bubbles are seen at the reservoir receptacle coming from the hose. At such time as the bleeding of one brake cylinder is completed, the brake bleeder valve is securely closed, the hose or tubing is removed, and the person moves to the next wheel cylinder where the process is repeated. Typically, the first brake cylinder bled is the cylinder farthest from the brake master cylinder. The next brake cylinder bled is the next farthest from the brake master cylinder, etc. For a vehicle with four wheels, one of the rear wheels is done first, then the opposite rear wheel. Then the front wheel farthest from the brake master cylinder and then the front wheel closest to the brake master cylinder.

Obviously, such brake bleeding procedure is relatively time consuming since two people are involved. There is equipment available which automatically keeps the brake master cylinder full of fluid. That eliminates the need for a third person, or for one of the two other persons involved to have to also add the hydraulic fluid as the hydraulic fluid is used. However, it is still necessary for the brakes to be bled one wheel cylinder at a time, and for two persons to be involved, one person to pressurize the brake pedal and the other person to open and close the brake bleeder valve with each pumping of the brake pedal.

Some bleeder valves have been designed so that the bleeding becomes a one-person job. Such systems include U.S. Pat. Nos. 2,771,093 (Wilson), 3,050,080 (Pagano), and 3,913,619 (Aulner et al).

The '093 (Wilson) patent discloses a bleeder valve having a radially extending bore communicating with an axially extending bore. A valve seat is disposed in the axially extending bore, and a tapered valve element is spring loaded in the axially extending bore against the valve seat. The valve element also includes a conically tapered surface at one end of the valve which extends into the valve seat in the wheel cylinder. The valve must accordingly be moved outwardly to allow fluid flow to the radially extending bore.

The '080 (Pagano) patent discloses a bleeder valve having a pair of ball check elements disposed in an axial bore. A compression spring biases the ball elements. A radially extending port communicates with the axial bore, and fluid flows out of the port when the fluid has been pressurized sufficiently to move the element 25 off its seat. The other ball element serves only to close one end of the axial bore and provides a structure against which one end of the compression spring bears.

The '619 (Aulner et al) patent discloses a bleeder valve which includes a radial bore which communicates with an axially extending bore. A ball element is disposed in the axial bore and is biased on a valve seat in the axial bore by a compression spring. The compression spring is held in the bore by a roll pin disposed in the axial bore. A cap is disposed over a bulbless portion of the valve element, and the roll pin extends through the bulbless portion. A cap is in turn disposed over the bulb portion and comprises a sealing element to prevent dirt, debris, etc., from getting into the axial bore when the apparatus is not in use.

The valve element includes a tapered portion adjacent to the radial bore, similar to the corresponding tapered portion of the valve element in the '080 patent. The tapered portions of the valve elements of both the '080 and '619 patent seal against a valve seat in the wheel cylinder in which the apparatus is installed.

It will be noted that in all three of the patents discussed above, the valve body comprises a single element. Each of the valve elements includes a tapered portion which seats against a mating portion in the wheel cylinder to which the valve bodies are secured. Accordingly, if the valve body is rotated slightly, even inadvertently, as through vibration, the braking system is liable to lose pressure and fluid. One embodiment of the apparatus of the present invention overcomes this specific problem by including a second valve member spring biased against an integral valve seat in the wheel cylinder. The valve element must be screwed a substantial distance before actuation of the brake system will develop sufficient pressure to overcome the bias of the spring to unseat the second valve element and thus to allow fluid to escape. Furthermore, bleeder ports in the secondary valve element remain covered by cylindrical walls of the main valve element for a substantial distance. Thus, a double security system is included to prevent the inadvertent loss of pressure and fluid in the brake system.

The apparatus of the present invention overcomes the problems of the prior art and allows all of the brakes to be bled at the same time, if desired. The apparatus of the present invention also makes it possible for one person to bleed all of the brakes by simply attaching a hose or tubing to each brake bleeder valve, providing receptacles to receive the hydrualic fluid from the brake system through the bleeder valves, and then opening the bleeder. valves. With a check valve integral with the valve, no fluid flows until the brake system is pressurized, and when the pressure is removed from the system the check valve prevents fluid and air from being sucked back into the system.

SUMMARY OF THE INVENTION

The invention described and claimed herein comprises method and apparatus for bleeding brake systems. The apparatus includes a brake bleeder valve with an integral check valve, and the method includes the steps of providing a bleeder valve with an integral check valve at each brake cylinder, securing an appropriate hose or tubing to the bleeder valves, opening the bleeder valves, and then pressurizing the brake system successively to bleed air from the system.

Among the objects of the present invention are the following:

to provide new and useful brake bleeder valve apparatus;

to provide new and useful brake bleeder valve having an integral check valve;

to provide new and useful brake bleeder valve having a check ball valve;

to provide a new and useful method for bleeding brakes;

to provide a new and useful method for bleeding brakes in which all of the brake wheel cylinders are bled at the same time;

to provide a new and useful method and apparatus for bleeding brakes utilizing only a single person to accomplish the brake bleeding; and to provide new and useful method and apparatus for bleeding fluid lines utilizing a valve having an integral check valve.

BRIEF DESCRIPTION OF THE DRAWING

FIG. 1 is a side view of the apparatus of the present invention in its use environment, with the use environment shown in partial section.

FIG. 2 is a perspective view of the apparatus of the present invention.

FIG. 3 is an enlarged view in partial section of the apparatus of the present invention.

FIG. 4 is a view in partial section of the apparatus of the present invention in its use environment illustrating the operation of the apparatus.

FIG. 5 is an exploded view of an alternate embodiment of the present invention.

FIG. 6 is a view in partial section taken generally along line 6—6 of FIG. 5.

FIG. 7 is a view in partial section illustrating the operation of the alternate embodiment.

DESCRIPTION OF THE PREFERRED EMBODIMENT

FIG. 1 is a side view in partial section of a backing plate 10 with a wheel cylinder 12 secured to the backing plate. Valve apparatus 60 of the present invention is shown appropriately secured to the wheel cylinder 12. Tubing 50 is shown secured by a retainer or clamp 52 to the valve apparatus 60.

The wheel cylinder 12 includes a central bore 14. Communicating with the central bore 14 is a threaded inlet port 16. Also communicating with the bore 14 is a bleeder port 18. The bleeder port 18 is shown at the top or uppermost portion of the bore 14. The threaded inlet port 16 is shown disposed substantially ninety degrees from the bleeder port 18. The valve body apparatus 60 is shown disposed in the wheel cylinder 12 and adjacent to the bleeder port 18.

A hydraulic fitting 40 is shown secured to the threaded inlet port 16. A hydraulic line 42 is in turn secured to the fitting 14 for providing hydraulic fluid to the bore 14 of the wheel cylinder 12.

An aperture 32 extends through the backing plate 10 to allow the hydraulic fitting 40 to be secured directly to the intake port 16 of the wheel cylinder 12. The wheel cylinder 12 is appropriately secured to the backing plate 10 by a pair of screws, including an upper screw 34 and a bottom screw 36. The screws 34 and 36 extend through apertures in the backing plate 10 and into threaded apertures within wheel cylinder 12. The arrangement of the backing plate 10 and the wheel cylinder 12 is well known and understood by those skilled in the art. Similarly, the arrangement of the bleeder valve 60 at the top or uppermost portion of the bore 14 is also well known and understood in the art.

FIG. 2 is a perspective view of the valve body apparatus 60 of the present invention. FIG. 3 is a view in partial section of the valve body apparatus 60 secured to the wheel cylinder 12, with the valve apparatus 60 in its closed position with respect to the wheel cylinder 12. FIG. 4 is a view in partial section of the valve body apparatus 60 and the wheel cylinder 12, with the valve body apparatus 60 in its open position, for bleeding the hydraulic fluid from the bore 14 to the wheel cylinder 12 and from the tubing 42. For the following discussion, reference will primatily be made to FIGS. 2, 3, and 4. However, reference to FIG. 1 may also be advantageous.

As best shown in FIG. 4, but as also may be understood from FIG. 3, the bleeder port 18 of the wheel cylinder 12 communicates with a conically tapered bore portion 20, which comprises a valve sat for the valve apparatus 60, as will be discussed below. The conical seat 20 comprises a conical shoulder between the bleeder port 18 and a cylindrical bore 22. The bore 22 is substantially greater in diameter than is the port 18. The bore 22 in turn communicates with an upper threaded bore portion 24.

The valve body apparatus 60 includes a shank or valve body 62 which includes a lower reduced diameter cylindrical portion 64 and an upper externally threaded portion 70. The threaded portion 70 matingly engages the threaded portion 24 of the wheel cylinder 12 to secure the valve body apparatus 60 to the wheel cylinder 12.

Remote from the externally threaded portion 70, and at the bottom of the reduced diameter cylindrical portion 64, is a conically a tapered portion 66. The conically tapered portion 66 engages the conically tapered seat portion 20 of the wheel cylinder 12 to provide a metal to metal seal between the valve apparatus 60 and the wheel cylinder 12. This is best shown in FIG. 3.

There is a flat tip 68 at the bottom of the valve apparatus 60. As shown in FIG. 3, the diameter of the flat portion 68 is substantially the same as, or slightly less than, the diameter of the bleeder port 18.

Adjacent to the threaded portion 70 of the valve apparatus 60 is a connector portion, which includes hex flats 80, a stem 82, and a flared portion 84. The hex flats 80 are used to secure an appropriate wrench to the valve apparatus 60 for opening and closing the valve apparatus 60 by rotating the valve body 62 relative to the wheel cylinder 12. The stem portion 82 comprises a connecting portion between the hex flats 80 and the flared portion 84. The purpose of the flared portion 84 is to allow tubing, such as the tubing 50, to be appropriately secured to the valve apparatus 60. The flared portion includes a flaring curved surface to facilitate the securing of the tubing 50 to the valve apparatus 60. The retainer or claim 52 secures the tubing 50 to the stem portion 82.

An end face 86 on the end of the flared portion 84 comprises the upper end of the valve apparatus 60. The end face 86 is generally parallel to the front tip 68.

Within the valve body apparatus 60 is a cylindrical bore 90. The bore 90 extends from the end face 86 to a conically tapered lower bore portion 92. The conically tapered bore portion tapers inwardly from the bore 90 to a lower cylindrical bore 94. The diameter of the bore 94 is less than the diameter of the bore 90. A cross bore 96 extends through the lower cylindrical portion 64 of the valve apparatus 60 to communicate with the lower bore 94.

The conically tapered portion 92 comprises a valve seat for a ball check element 100 disposed within the bore 90. A compression spring 102 extends between the ball 100 and lug 104. The plug 104 is disposed within the bore 92 inwardly or downwardly from the end face 86. The plug 104 includes a bore 106 through which hydraulic fluid flows. The purpose of the plug 104 is to provide a fixed surface for the compression spring 102. The plug 104 is appropriately secured within the bore 90, as by a press fit.

The insert or plug 104 comprises a sleeve having a longitudinally extending bore 106. The plug or insert 104 is preferably fitted into the bore 90 and extends into the bore 90 from the end face 86 of the valve body 62. To aid in inserting the plug 104 into the bore 90, the plug includes an inwardly tapered front portion 108.

As best shown in FIG. 3, when the valve apparatus 60 is in its closed position, its conically tapered portion 66 is seated against the conical seat 20 of the wheel cylinder 12. There is a metal to metal seal between the two tapered portions 20 and 66 to seal the bleeder port 18 from the bore 22. As shown in FIG. 3, the taper of the conical seat 20 and the taper of the conical portion 66 of the valve 20 are substantially the same, and accordingly a relatively secure seal is effected when the valve apparatus 60 is in its closed position.

It will be noted that the ball check element 100 is fully seated against its conical seat 92 by the bias of the compression spring 102. This insures that there is no fluid or air able to get into or out of the bores 94 and 96 from the tubing 50.

In FIG. 4, the valve apparatus 60 is in its open position, with its tapered portion 66 moved away from the tapered portion 20 of the wheel cylinder 12. When the valve 60 is open, fluid under pressure from the bore 14 of the wheel cylinder 12 will flow through the bleeder port 18 and through the conical portion 20 to the bore 22. From the bore 22, the fluid will flow through the intersecting bores 96 and 94 and against the ball check element 100. If the valve 60 is opened inadvertently, fluid will not flow past the ball check element 100 until the fluid pressure from the wheel cylinder 12 overcomes the bias of the compression spring 102. However, when the fluid pressure overcomes the bias of the compression spring 102, as when the system is pressurized for purposes of bleeding the system, or when the brakes are actuated, then the ball 100 is unseated, and fluid flows from the bore 94 into the bore 90, and outwardly through the bore 106 of the plug 104 and into the tubing 50.

When pressure is removed from the hydraulic system, the ball 100 immediately seats itself on its conically tapered seat 92 under the bias of the compression spring 102 to prevent any backflow of fluid or air through the tubing 50 and the bores 106 and 90. Accordingly, no air bleeds back into the system, or is sucked back into the system, when fluid pressure is released.

The bleeding of brakes, as illustrated in FIG. 1, or the bleeding of any general or specific hydraulic system, may be accomplished by only one person. In a brake system, all of the brakes may be bled at the same time. For example, in a hydraulic brake system which includes four wheel cylinders (or brake cylinders), as in a typical automotive vehicle with either drum-type brakes or disc-type brakes, a bleeder valve apparatus 60 is secured to each wheel brake cylinder. Also, tubing 50 is appropriately secured to the wheel cylinder, and the tubing is extended to an appropriate reservoir or receptacle for receiving the fluid from the cylinders and through the tubings 50.

The bleeder valves 60 are then opened, as shown in FIG. 4. In the open position, the tapered portion 66 of the valve 60 is moved off of the mating tapered portion 20 of the wheel cylinder 12. However, the ball check element 100 remains seated against the conical seat 92 between the bores 90 and 94 under the bias of the compression spring 102. Accordingly, fluid may flow from the bore 14 through the bleeder port 18 to the bore 22, and to the bores 96 and 94.

No fluid will flow through the valve 60 until the hydraulic system, as through the hydraulic line 42, is placed under pressure sufficient to unseat the ball 100. Then, when the hydraulic system is pressurized sufficiently to overcome the bias of the spring 102, it unseats the ball check element 100. Hydraulic fluid will then flow from the line 42, the bore 40, the bleeder port 18, and the various bores, and ultimately outwardly through the tubing 50, as discussed above.

The valve 60 does not need to be closed before pressure maybe released from the system, as when the brake pedal is released. This is so because the ball 100 will immediately seat to seal the valve 60 as soon as the pressure diminishes below the force of the spring 102. Upon subsequent pressure, as when the brake pedal is again pushed, or when the hydraulic system is again pressurized, hydraulic fluid again will flow, along with any air trapped in the system, through the hydraulic lines 42, the bore 14, and through the port 18 and the valve 60, as discussed above. The location of the bleeder port 18 at the top or uppermost portion of the wheel cylinder bore 14 assures that any air will be forced from the system, as is well known and understood since the air inherently rises.

While the environment shown in FIG. 1 is particularly designed for a brake system, it will be understood that virtually any hydraulic system may be bled by the valve apparatus 60 of the present invention. FIGS. 3 and 4 need not be restricted to the brake wheel cylinder environment of FIG. 1, but are illustrative of any type of hydraulic system with which the bleeder valve apparatus 60 of the present invention may be used. Thus, the bore 14 of FIGS. 3 and 4 is symbolic of the upper portion of a hydraulic system, and the bleeder port 18 simply provides a communication between the valve 60 and the respective bore and conical portions associated with the valve 60 in the hydraulic system.

FIG. 5 is an exploded perspective view of an alternate embodiment of the brake bleeder apparatus of the present invention, comprising valve apparatus 110. FIG. 6 is a view in partial section taken generally along line 6-6 of FIG. 5, illustrating the valve apparatus 110 in its use environment and in its closed position. FIG. 7 is a view in partial section illustrating the valve 110 in its open, bleeding position. For the following discussion, reference will primarily be directed to FIGS. 5, 6, and 7.

The valve apparatus 110 includes a primary or external valve body 112 and a secondary or internal valve body 150. The primary valve body 112 includes a reduced diameter cylindrical portion 114 which terminates in an end 116. The end 116 is relatively flat, and is substantially perpendicular to the longitudinal axis of the valve body 112, including the reduced diameter cylindrical portion 114.

The primary valve body 112 has an intermediate portion 118 adjacent to the reduced diameter portion. The intermediate portion is externally threaded adjacent to the reduced diameter cylindrical portion 114. The intermediate or threaded portion 118 of the valve body 112 extends from the reduced diameter cylindrical portion 114 to an outer, enlarged diameter portion which includes wrench flats 120. Adjacent to the wrench flats 120, and remote from the threaded portion 118, is a relatively short stem portion 122. Adjacent to the stem 122, and remote from the wrench flats 120 is a flared portion 124. The flared portion 124 terminates in an outer end face 126. The end face 126 is substantially parallel to the end 116, and is accordingly substantially perpendicular to the longitudinal axis of the valve body 112.

Within the valve body 112 are several bores. The bores include an inner bore 130. The inner bore 130 extends from the end 116 axially within the valve body to a conically tapered bore portion 132. The conically tapered portion 132 is a transition bore portion between the inner bore 130 and a middle bore 134. The diameter of the middle bore 134 is less than the diameter of the inner bore 130.

The middle bore 134 extends from the conically tapered portion 132 to a second conically tapered portion 136. An outer bore 138 extends from the tapered portion 136 to the end face 126. The diameter of the outer bore 138 is less than the diameter of the middle bore 134.

The secondary valve body 150 includes a cylindrical portion 152, the outer diameter of which is slightly less than the inner diameter of the outer bore 130 of the valve body 112. The cylindrical portion 152 of the secondary valve body 150 is disposed in the bore 130, and is axially or longitudinally movable therein. The length of the bore 130 is greater than the length of the cylindrical portion 152.

The cylindrical portion 152 terminates at an outer end 153. The end 153 is generally flat and is generally perpendicular to the longitudinal axis of the secondary valve body 150, and accordingly to the longitudinal axis of the cylindrical portion 150.

Within the cylindrical portion 152 is an axial bore 154. The axial bore 154 terminates in a tapered end 155. Between the end 155 and the outer end 153 is a pair of radially extending apertures. The radially extending apertures include an aperture 156 and an aperture 158. The apertures 156 and 158 provide communication between the bore 154 in the secondary valve body 150 and the space outside the secondary valve body 150 and the cylindrical portion 152 through which fluid flows when the valve apparatus 150 is open, as best shown in FIG. 7.

Adjacent to the cylindrical portion 152 is an enlarged diameter nose portion 160. A shoulder 162 extends radially outwardly from the cylindrical portion 152 to an outer cylindrical surface 164 of the nose portion 160. From the cylindrical outer surface 164, the nose portion 160 includes a conically tapered portion 166. The conically tapered portion 166 terminates in a flat tip 168 remote from the cylindrical surface 164. The flat tip 168 is substantially perpendicular to the longitudinal axis of the secondary valve body 150.

The conically tapered surface 166 comprises a sealing surface which seals against the conical seat 20 in the wheel cylinder 12. This is best shown in FIG. 6.

A compression spring 170 is disposed in the primary valve body 112 between the tapered bore portion 136 and the end 155 of the bore 154 of the secondary valve body 150. The compression spring 170 accordingly is disposed within, and extends through, the bore 134, the bore 132, and the bore 130, of the primary valve bodies 112, and through the bore 154 of the secondary valve body 150. The compression spring 170 provides sufficient bias between the primary valve body 112 and the secondary valve body 150 to keep the secondary valve body 150 in a sealing engagement with the valve seat 20 of the wheel cylinder 12 when the primary valve body 112 is unthreaded slightly, or is loosened slightly, from the wheel cylinder 12. This, of course, prevents the inadvertent loss of hydraulic fluid in case of a slight loosening of the primary valve body 112. Moreover, as is best shown in FIG. 6, the primary valve body 112 must be threadedly released from the wheel cylinder 12 a distance to uncover the ports or radial apertures 156 and 158 to allow fluid from the bore 18 of the wheel cylinder 12 to flow into the bore 22 and through the ports or bores 156 and 158 into the bore 154 and then outwardly of the valve apparatus 110.

With the primary valve body 112 threadedly released from the threaded portion 24 of the bore 22 a distance sufficient to uncover the ports 156 and 158 from the end 116, the secondary valve body 150 will remain in sealing engagement with the valve seat 20 of the wheel cylinder 12 until the brake system is pressurized. The sealing is, of course, accomplished by means of the compression spring 170 urging the secondary valve body against the valve seat 20. When the brake system is pressurized, fluid pressure through the bore 18 against the flat tip 168 moves the secondary valve body 150 against the bias of the spring 170. Fluid then flows through the bore 18, through the bore portion of the valve seat 20, and into the bore 22. From the bore 22 the fluid flows through the ports or apertures 156 and 158 and into the interior of the bore 154 of the secondary valve body, and then through the bores 130, 132, 134, 136, and 138, and outwardly from the primary valve body 112. When fluid pressure is released, the compression spring 170 urges the secondary valve body 150 to again seat against the valve seat 20 to seal the hydraulic system. The above steps are then repeated as often as necessary to appropriately bleed the brake system.

To close the system, to insure no leakage, etc., the primary valve body 112 is rotated or screwed inwardly until the end 116 of the primary valve body 112 is disposed against the shoulder 162 of the secondary valve body 150 to urge the secondary valve body 150 to be seated against the valve seat 20 of the wheel cylinder 12.

As shown in FIGS. 6 and 7, there is a substantial axial distance between the shoulder 162 and the radial ports or apertures 156 and 158. The primary valve body 112 must be screwed to the extent that the end 116 is outwardly disposed from the ports or apertures 156 and 158 a distance sufficient to allow fluid to flow through the ports 156 and 158 when the secondary valve body 150 is moved away from the valve seat 20. That is, fluid will not flow from the bores 18 and 22 of the valve cylinder 12 even though the secondary valve body 150 is moved away from the valve seat 20. It is only when the ports 156 and 158, and any other radial ports or apertures, as desired, are fully clear of the primary valve body 112 when the secondary valve body 112 is away from the valve seat 20, that fluid will flow outwardly from the valve apparatus 110. Thus, even with the primary valve body 112 slightly unscrewed or loosened from its fully closed position, as shown in FIG. 6, will fluid leakage or fluid flow occur. This provides a double sealing system. The first sealing system is the conical tapered surface 166 seating against, and accordingly sealing with, the valve seat 20, and the secondary sealing system is the coaxial arrangement or orientation of the secondary valve body 150, or the cylindrical portion 152 of the secondary valve body 150, disposed within the inner bore 130 of the primary valve body 112.

There is at least a sliding fit between the two valve bodies 112 and 150 to allow relative movement therebetween. However, the tolerances between the two elements, particularly between the diameter of the bore 130 and the outer diameter of the cylindrical portion 152, should be kept within reasonably close tolerances to prevent the inadvertent loss of fluid and fluid pressure if the primary valve body 112 should become inadvertently loosened from its threaded engagement with the internal threads 24 of the wheel cylinder 12 and the brake system is pressurized.

It will be noted that the radial apertures or transverse bores 156 and 158 are disposed along the length of the bore 154 between the outer end 153 of the cylinder 152 and the end 155 of the bore. The intermediate location of the bores or apertures 156 and 158 provides a degree of safety with respect to the loss of fluid by the inadvertent loosening of the primary valve body, and also insures that the valve body 112 is positively rotated in order for the bleeding procedure to be accomplished. That is, the valve body 112 has to be rotated by means of a wrench attached to the wrench flats 120, or the like, so that the valve body 112 is moved outwardly to have the end 116 of the valve body 112 clear, or at least uncover to a substantial degree, the bores or apertures 156 and 158.

It will be noted that merely uncovering only slightly the bores or apertures (fluid ports) 156 and 158 will not allow the bleeding of the brakes because when fluid pressure, by brake actuation, is placed on the end 168 of the secondary valve body 150, movement of the secondary valve body 150 would again cover the bores 156 and 158 and thus the hydraulic fluid would not be able to flow. The end 156 of the primary valve body 112 must uncover the ports 156 and 158 a sufficient distance to allow fluid to flow from the bore 22 through the bores 156 and 158 after the secondary valve body 150 is moved by the pressurized hydraulic fluid.

As best shown in FIG. 6, when the valve apparatus 110 is in its closed position the end 116 of the primary valve body 112 is disposed against the shoulder 162 of the secondary valve body 150. The conical portion 166 of the secondary valve body 150 is disposed against the seat 20 by virtue of two features. The first feature is, of course, the bias of the compression spring 170. The second feature is the urging of the secondary valve body 150 by the primary valve body 112 by the contacts between the end 116 and the shoulder 162.

It will be noted that the apertures or ports 156 and 158 are located about the midpoint of the bore 154, between the outer end 153 and the tapered end 155. Locating the bores or ports at about the midpoint of the cylindrical portion 152, and at about the midpoint of the bore 154, requires that a positive opening action of the primary valve body 112 be made before any bleeding action, or any fluid loss, occurs. However, it will be understood that the bores or ports 156 and 158 could be located closer to the interior end of the bore 154, or closer to the tapered end 155, if desired. In the alternative, of course, the apertures or ports 156 and 158 could also be located closer to the outer end 153. Moreover, in place of two bores or ports 156 and 158, as shown, there could be only one such aperture or port or more than two, if desired.

Except as noted, the bleeder apparatus 110 functions generally in the same manner, with respect to the bleeding of hydraulic system, as does the apparatus 10. The flared port portion 124 comprises a coupling portion to which a bleeder hose, or the like, is secured, for conveying hydraulic fluid bled through the valve apparatus 10 from the cylinder 12. On the other hand, the actual functioning of the two different valve embodiments is completely different since the structures of the two valves are different. The structure of valve apparatus 60 utilizes a balance check element, while the structure of valve apparatus 110 utilizes a secondary valve body, and the secondary valve body includes a bore and ports provide communication between interior bore or secondary valve body and the hydraulic system. Hydraulic system bleeding is accomplished only when the ports are uncovered by the primary valve body. In both embodiments, a compression spring is used to urge the sealing of the hydraulic system.

While the principles of the invention have been made clear in illustrative embodiments, there will be immediately obvious to those skilled iin the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Bleeder valve apparatus for bleeding a hydraulic system having a valve seat, comprising, in combination:
   primary valve body means movable between an open, bleeding position and a closed, sealing position, including:
     a primary valve body, including an end,
     means for securing the primary valve body to the hydraulic system to be bled, and
     first bore means in the primary valve body extending from the end through the primary valve body;
   secondary valve body means movable relative to the primary valve body means, including:
     a first portion disposed and movable in the first bore means of the primary valve body and having an outer end,
     a second portion remote from the outer end adapted to seat against the valve seat of the hydraulic system to seal the hydraulic system and the primary and secondary valve body means,
   second bore means in the first portion communicating with the first bore means of the primary valve body, and extending from the second portion to the outer end of the first portion, and
   aperture means extending through the first portion between the outer end and the second portion, and covered by the first bore means when the primary valve body means is in the sealing position, to provide communication between the second bore means and the hydraulic system when the valve body means is moved to the bleeding position to provide relative motion between the primary and secondary valve body means to uncover the aperture means; and
   spring means disposed in the first and second bore means to urge the secondary valve body means away from the primary valve body means and to urge the second portion of the secondary valve body means against the valve seat to seal the hydraulic system.

2. The apparatus of claim 1 in which the secondary valve body means further includes a shoulder between the first portion and the second portion, and the end of the primary valve body is disposed on and against the shoulder in the closed, sealing position.

3. The apparatus of claim 1 in which the first bore means of the primary valve body means includes
   an outer bore through which hydraulic fluid flows out of the apparatus,
   a middle bore,
   an inner bore,
   tapered portions connecting the outer and the middle bores and the middle and inner bores, and
   the first portion of the second valve body means is disposed in the inner bore.

4. The apparatus of claim 3 in which the means for securing the primary body means to the hydraulic system includes threaded means for rotating the primary body means relative to the hydraulic system to move the primary body means between the open position and the closed position.

5. The apparatus of claim 1 in which primary valve body means includes a reduced diameter cylindrical portion adjacent to the means for securing the primary valve body to the hydraulic system to be bled, and the inner bore is disposed within the reduced diameter cylindrical portion.

6. The apparatus of claim 1 in which the primary body means further includes coupling means for securing a bleeder hose to the primary body means.

* * * * *